Feb. 25, 1947. P. E. BRUNBERG 2,416,374
METHOD AND APPARATUS FOR SPOT WELDING
Original Filed Oct. 9, 1941

INVENTOR.
Paul E. Brunberg
BY
Barnes, Kisselle, Laughlin & Raisch
Attorneys.

Patented Feb. 25, 1947

2,416,374

UNITED STATES PATENT OFFICE 2,416,374

METHOD AND APPARATUS FOR SPOT WELDING

Paul E. Brunberg, Detroit, Mich., assignor, by direct and mesne assignments, of forty-five one-hundredths to Nita Carol Brunberg, Detroit, Mich.

Original application October 9, 1941, Serial No. 414,259, now Patent No. 2,329,977, dated September 21, 1943. Divided and this application September 4, 1942, Serial No. 457,345

3 Claims. (Cl. 219—4)

This invention relates to a method and apparatus for spot welding and has particularly to do with a cooling and protecting arrangement for electrodes.

In spot welding tool preservation has long been a problem. Tools oxidize and must be cleaned over and over again. Furthermore the excessive heat of the welding contributes to the tool break down.

It is an object of the present invention to provide a tool design and apparatus which protects the tool against oxidation and excessive heat by a simple expedient.

Further objects of the invention will appear as the description progresses.

The subject matter to be described and claimed herein is taken from my prior and copending applications, Serial No. 390,226 and 414,259 filed, respectively, April 25, 1941, and October 9, 1941. This application is a continuation in part of the former application and a division of the latter, which is now Patent No. 2,329,977, dated September 21, 1943.

Figure 1:
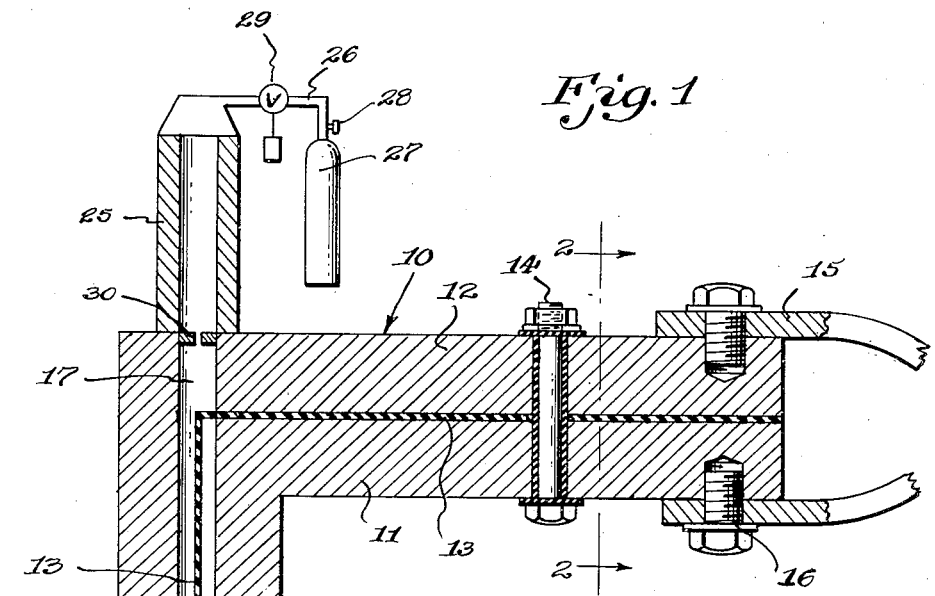
Figure 1 illustrates a sectional view of a tool constructed according to this invention showing diagrammatically a gas circuit.
Figure 2:
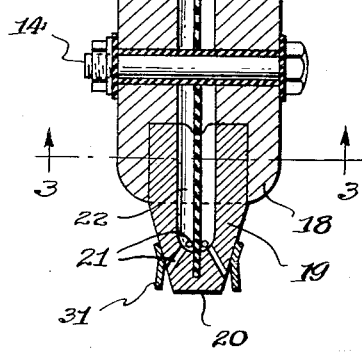
Figure 2 is a sectional view on line 2—2 of Fig. 1.
Figure 2:
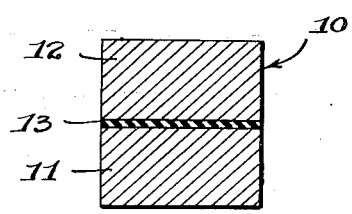
Figure 3:
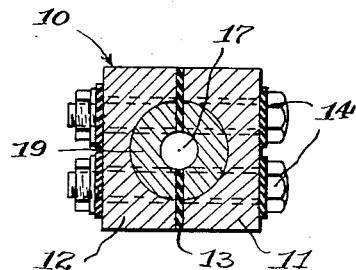
Figure 3 is a sectional view on line 3—3 of Figure 1.

In Figure 1 the electrode is shown generally as an L shaped member 10. It is composed of two members 11 and 12 separated by insulation 13 and held together by clamping bolts 14. One leg of the L is provided for connection to suitable cables at 15 and 16. The other leg of the L is provided with a central opening 17, passing all the way through. The operating end 18 is drilled out and insert 19 is held therein either by threading or the clamping action of bolts 14. Insert 19 is provided with a contact tip 20 and holes 21 lead from a central bore 22 which registers with the opening 17. In the main tool at the other end of the opening 17 is a connection 25 and a tube 26 leading to a gas tank 27. A valve 28 controls the outlet of the gas tank and valve 29 is arranged to control the entrance of gas into the connection 25. A restriction 30 is provided at the entrance of opening 17.

Around the operating tip 20 is an inclosing member 31 for directing gas from outlets 21 to the tip of the tool and the work contacted by the tool.

The opening in restriction 30 is preferably made by a drill around size 60 for pressure in tank 27 of 125 to 150 pounds. Gas used in tank 27 is preferably carbon dioxide ($CO_2$). In operation the valve 29 may be arranged so that when the tool tip 20 comes in contact with the work and power is applied the valve 29 will be open to permit gas to flow in the chamber 17 and out of ports 21. The other contact tool will, of course, have the same construction. As the gas passes through restriction 30 it expands into chamber 17, after which it passes from the outlets 21 to the inclosing member 31. A refrigerating effect is noticed as the gas passes from the high pressure through the restriction 30 and likewise out of ports 21. Since the gas is a non-oxidizing gas it will envelope the tool tip and the work and prevent oxidation during the operation. The effect, therefore, is not only to cool the tool but to prevent destruction, thereof, between heat and oxidation which would otherwise occur.

Various other pressures and restrictions may be used as long as a suitable refrigerating effect is obtained. The outlet ports 21 are, of course, larger in area than the restriction 30.

An important object and feature of the invention is the cooling effect on the work between the electrodes. Gas expanding from ports 21 has a refrigerating effect not only on the tool tip but also on the work between the tips. This is extremely important especially in the case of aluminum welding. Without substantial cooling immediately following the weld, destructive grain changes are evident which weaken the resulting structure.

I claim:

1. A method of cooling and protecting the electrode and work in spot welding which comprises conducting during passage of the welding current compressed, non-oxidizing gas to the interior of a hollow electrode, permitting partial expansion of the gas within the electrode to obtain a cooling of the electrode body, conducting the gas further to the tip of the tool and discharging the same to atmosphere thus permitting further expansion and directing the same toward the work at the tool to cool the tool and the work by reason of the refrigerating effect of the further expansion.

2. A welding electrode unit, comprising a body with a hollow interior, a supply line providing a refrigerant connection with said hollow interior near the outer end of the electrode by means of a very small orifice which permits the first stage expansion of said refrigerant to cool the electrode and said electrode unit having a welding tip with a hollow interior connecting with the hollow interior of the body of the electrode and having one or more restrictive jet openings directed toward the work and the welding area and arranged in cooperation with the unit to direct and confine refrigerant passing through the openings to the environment of the tip and weld, the area of said jet opening or openings being somewhat larger than the inlet orifice at the other end of the electrode to permit a second-stage expansion to cool the tip, the weld, and with the use of a neutral fluid as a refrigerant, providing a non-oxidizing atmosphere around the tip and the weld during the welding operation to thereby prevent oxidization of the tool and the work.

3. A welding electrode, comprising a body with a hollow interior, a supply line providing a refrigerant connection with said hollow interior near the outer end of the electrode by means of a very small orifice which permits the first-stage expansion of said refrigerant to cool the electrode and said electrode having a welding tip with a hollow interior connecting with the hollow interior of the body of the electrode and having one or more restrictive jet openings leading toward the work and the welding area, the area of said jet opening or openings being somewhat larger than the inlet orifice at the other end of the electrode to permit a second-stage expansion to cool the tip, the weld and with the use of a neutral fluid as a refrigerant providing a non-oxidizing atmosphere around the tip and the weld during the welding operation to thereby prevent oxidization of the tool and the work and means arranged around the tip to the outside of and cooperating with the jet opening or openings to direct and confine the gas to the environment of the tip and weld.

PAUL E. BRUNBERG.

REFERENCES CITED

The following references are of record in the file of this patent:

UNITED STATES PATENTS

| Number | Name | Date |
| --- | --- | --- |
| 2,281,335 | Somes | Apr. 28, 1942 |
| 1,281,454 | White | Oct. 15, 1918 |

FOREIGN PATENTS

| Number | Country | Date |
| --- | --- | --- |
| 40,610 | France | Apr. 26, 1932 |